United States Patent [19]

Jay et al.

[11] 4,108,789

[45] Aug. 22, 1978

[54] DIELECTRIC COMPOSITIONS CONTAINING BENZYL ESTERS

[75] Inventors: Pierre Jay, Saint-Didier au Mont d'Or; Ghislain Schwachhofer, Le Mas Rillier Ol-Miribel, both of France

[73] Assignee: Rhone-Poulenc Industries, Paris, France

[21] Appl. No.: 806,454

[22] Filed: Jun. 14, 1977

Related U.S. Application Data

[63] Continuation of Ser. No. 716,563, Aug. 23, 1976, abandoned.

[30] Foreign Application Priority Data

Aug. 28, 1975 [FR] France ............................ 75 26954

[51] Int. Cl.² ............................................. H01B 3/20
[52] U.S. Cl. ................................. 252/64; 174/17 LF; 336/94; 361/315
[58] Field of Search ................ 252/64, 63; 260/410.5; 560/254; 336/58, 94; 174/17 LF; 361/315, 319

[56] References Cited

U.S. PATENT DOCUMENTS

| | | |
|---|---|---|
| 2,173,124 | 9/1939 | Meyer et al. ........................ 560/254 |
| 2,318,373 | 5/1943 | Clark .................................... 252/64 |
| 2,492,210 | 12/1949 | Clark .................................... 252/64 |
| 2,837,724 | 6/1958 | Cook ................................ 252/63 X |
| 3,112,356 | 11/1963 | Cohen .............................. 252/64 X |
| 3,855,508 | 12/1974 | Ross et al. ...................... 361/315 X |
| 3,925,221 | 12/1975 | Eustance ........................... 252/64 X |
| 3,948,787 | 4/1976 | Munch .............................. 252/64 X |

OTHER PUBLICATIONS

Bilyk et al., "Non-Volatile Alpha-Branched Chain Fatty Esters II", Journal of the Amer. Oil Chemists' Society, vol. 45, pp. 453–455, Jun. 1968.

*Primary Examiner*—Harris A. Pitlick
*Attorney, Agent, or Firm*—Bacon & Thomas

[57] ABSTRACT

Dielectric compositions comprising benzyl esters of α-branched chain alkyl-substituted saturated monocarboxylic acids having improved thermal and chemical stability for extended periods of operation under varying conditions are provided.

12 Claims, 3 Drawing Figures

DIELECTRIC COMPOSITIONS CONTAINING BENZYL ESTERS

This is a continuation of application Ser. No. 716,563, filed Aug. 23, 1976, now abandoned.

BACKGROUND OF THE INVENTION

1. Field of the Invention

The present invention relates to dielectric compositions useful as insulating material for electrical equipment, particularly as liquid dielectric impregnants for capacitors.

2. Description of the Prior Art

Liquid insulating or dielectric compositions are used extensively in the manufacture of various electrical devices. For example, electrical devices such as capacitors, transformers, circuit breakers, cables and the like require a liquid dielectric composition having high permittivity, good thermal stability and non-inflammability. Halogenated aromatic compounds, specifically chlorinated diphenyl and chlorinated naphthalene, since they possess many of the desired characteristics, have been widely used as electrical insulating material in electrical equipment. A difficulty arises in the use of these halogenated aromatic compounds when after extended periods of time electrical discharge, elevated temperatures, high voltage or chemical hydrolytic attack may cause partial decomposition of these compounds. The decomposition products are generally hydrogen halides including hydrogen chloride which adversely affects the properties of the dielectric material and corrodes the various components of the apparatus.

The undesirable effect of the above decomposition is further manifested when the above halogenated aromatic compounds are used as capacitor dielectric impregnants. Thus, under high operating temperatures and direct current voltages, capacitors impregnated therewith undergo a characteristic type of deterioration which results in an ever increasing leakage current, a short capacitor life, visible localized decomposition of the dielectric and corrosion of the electrodes. Moreover, in the case of capacitors operating on alternating current, the decomposition sometimes results in an excessive increase in power factor of the dielectric material.

Furthermore, the liquid dielectric compositions employed in insulating the electrical apparatus must combine a certain number of properties such as low initial conductivity, conductivity after aging, resistance to thermal decomposition, resistance to decomposition by hydrolysis, relatively low viscosity, low vapor pressure, and low freezing point with the ability to vary the permittivity characteristic to meet specific electrical component design requirements.

Accordingly, a need exists to provide a liquid dielectric composition retaining the desired properties mentioned above whereby the deleterious action of hydrogen halides on the various components of the electrical apparatus is eliminated or materially reduced. A need also exists to provide the desired properties over extended periods of time and under widely varying conditions.

SUMMARY OF THE INVENTION

In accordance with the present invention, it has been found that dielectric compositions comprising benzyl esters of α-branched chain alkyl-substituted saturated monocarboxylic acids of the general formula:

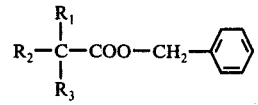

wherein:
- $R_1$ is hydrogen or alkyl;
- $R_2$ and $R_3$ are alkyl; and
- $R_1$, $R_2$ and $R_3$ are the same or different alkyl; and the total number of carbon atoms contained in $R_1$, $R_2$ and $R_3$ is between 3–20, preferably between 5–11, and most preferably between 7–9;

provide improved permittivity, along with other desirable electrical properties over extended periods of operation without appreciable deterioration and corrosion effects. The benzyl esters of the present invention provide improved dielectric material whether used by themselves or admixed with known compatible dielectrics. The dielectric compositions of this invention are suitable for insulating and dielectric users in electrical devices such as, capacitors, transformers, electrical switches, cables and the like.

It is therefore an object of this invention to provide a dielectric material maintaining high permittivity, and good thermal and chemical stability over extended periods of operation.

Another object of the present invention is to provide improved liquid dielectric materials compatible with known dielectrics.

Still another object of the present invention is to provide liquid dielectric materials particularly useful for insulation of electrical transformers and for the impregnation of capacitors.

A further object of the present invention is to provide a dielectric composition which can be used for extended periods of time and under widely varying conditions without deterioration of dielectric properties and corrosive effects of the electrical equipment.

DESCRIPTION OF THE PREFERRED EMBODIMENTS

Figure 1:
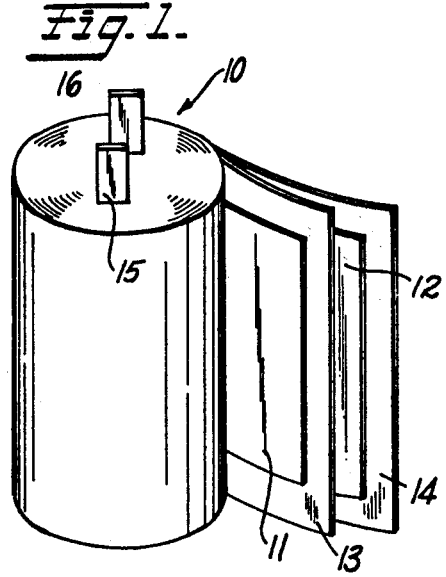
FIG. 1 is a top perspective of a capacitor which can be insulated according to the invention.

The compounds useful in providing new dielectric compositions comprise benzyl esters of α-branched chain alkyl-substituted saturated monocarboxylic acids of the formula:

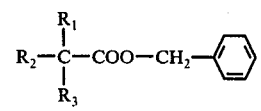

wherein:
- $R_1$ is hydrogen or alkyl;
- $R_2$ and $R_3$ are alkyl; and
- $R_1$, $R_2$ and $R_3$ are the same or different alkyl; and the total number of carbon atoms contained in $R_1$, $R_2$ and $R_3$ is between 3-20, preferably between 5-11, and most preferably between 7-9.

Illustrative of compounds useful in this invention are benzyl 2,5 dimethylhexanoate; benzyl 2-ethylhexanoate; benzyl 2-n-propylpentanoate; benzyl 2-methyloctanoate; benzyl 2-methyl 2-n-propylpentanoate; benzyl 2-isopropyl 5-methylhexanoate and the mixtures of two or mote of such esters.

The compounds of this invention can be prepared by methods well known in the art. For example, by the esterification of the corresponding acids with benzyl alcohol or preferably by the reaction of an alkali metal salt of the corresponding acid with benzyl chloride. The above reactions are conducted at moderate temperatures generally with the operable range of from about 20° to 200° C.

Suitable saturated monocarboxylic acids useful in the present invention are 2-methylhexanoic acid; 2,2 dimethylpentanoic acid; 2-methyl 2-ethylbutanoic acid; 2-ethylhexanoic acid; 2-methyl octanoic acid; 2-methyl 2-n-propyl pentanoic acid; 2-isopropyl 5-methylhexanoic acid and their mixtures.

The resultant esterification products are treated in known manner for subsequent use as dielectrics. That is, they may be purified by simple distillation, steam distillation, or any other typically employed physical method of separation. Optionally, the distillate may be recovered in the form of several fractions, any of which may be employed within the scope of the present invention.

The compounds of this invention have the ability to form admixtures both between themselves and various dielectrics known in the prior art such as, chlorodiphenyls, alkylchlorodiphenyls, chlorobenzenes, trichlorobenzenes and alkylation products of benzene or diphenyl to yield final properties such as viscosity and permittivity which may be tailored for particular uses. The proportions of the various components of these dielectric compositions are not critical, however, it is preferred that the dielectric composition admixture contain at least 10 weight percent of the benzyl ester compound of this invention.

It is also possible to increase the permittivity of the benzyl esters of this invention by incorporating therein compatible solid or liquid compounds having a high dielectric constant. Suitable compounds having a high dielectric constant are monocyanophenoxybenzenes, and monocyanodiphenyls, described in U.S. patent application Ser. No. 593,304 now U.S. Pat. No. 4,019,996, and particularly preferred are monocyanoterphenyls described in French Patent Application No. 75/17,209. In general the proportion of the above compounds having a high dielectric constant admixed with the benzyl esters of this invention ranges from 5 to 50 weight percent of the final dielectric composition and depends on the desired value of the overall permittivity and the compatibility of the components.

Conventional stabilizers can be incorporated into the dielectric compositions of this invention. Particularly suitable for this purpose are epoxide compounds such as epoxidized polybutadiene with a molecular weight of about 2000. A concentration of the stabilizer in the range of 0.05 to 5 weight percent of the total dielectric composition is desirable and a concentration of about 0.3 to 1.0 weight percent is preferred.

Before use in electrical devices the dielectrics of this invention are subjected to conventional treatment with activated earths.

The dielectric compositions of this invention are suitable for insulating and dielectric uses in electrical devices such as, capacitors, transformers, electrical switches, circuit breakers, cables and the like and particularly where the use of a liquid dielectric composition is required. The dielectric compositions of this invention are particularly useful for the impregnation of capacitors and especially mixed capacitors. Mixed capacitors have the internal insulating walls constructed of paper and polyolefins. With conventional dielectric compositions capacitor performance was hindered by the hydrolysis of the dielectric composition which may be caused by the residual water contained in the paper. The dielectric compositions of this invention, on the other hand, are very stable to hydrolysis and overcome this problem. Advantageously the benzyl ester compositions impregnate easily and thoroughly the polyolefin films. In addition, these dielectric compositions have the exceptional property to prevent partial discharges at very low temperatures.

The following example is given to illustrate the invention.

EXAMPLE

A mixture of α-branched chain saturated monocarboxylic acids of the formula:

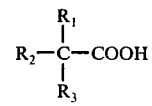

wherein:
$R_1$ is hydrogen or alkyl;
$R_2$ and $R_3$ are alkyl; and
$R_1$, $R_2$ and $R_3$ are the same or different and the total number of carbon atoms contained in $R_1$, $R_2$ and $R_3$ is between 7 to 9;

having an acid number of 325 mg. of potassium hydroxide per gram of acid and a refractive index $n_D$ of 1.4425 is neutralized with sodium carbonate. The resulting sodium salt is reacted with benzyl chloride at a temperature of 100° C. The resulting mixture of benzyl esters is separated from the reaction mixture by distilling at a temperature of between 120° and 135° C under 1 mm Hg. After separation the liquid mixture of benzyl esters has a dielectric constant $\epsilon$ of 3.31 at 90° C and 50 c/s.

Figure 2:
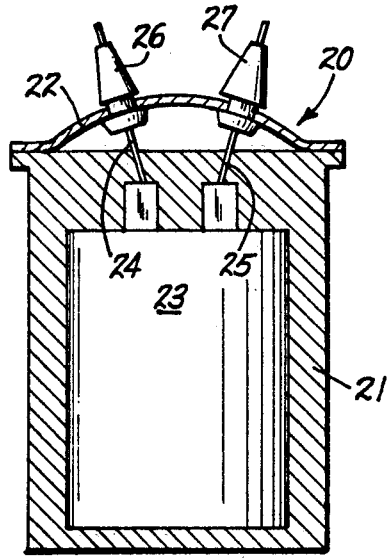
FIG. 2 is a vertical cross-section of a capacitor which has been insulated according to the invention.

In order to compare the electrical characteristics of the capacitors containing as dielectric elements of compositions embodying this invention, capacitors such as that described in FIGS. 1 and 2 of the accompanying drawing were used. Referring specifically to the figures of drawing, FIG. 1 depicts a component 10 of a capacitor, comprising two electrodes which are defined by the foils 11 and 12, which foils are made of aluminum or any other suitable material and which are shown as being separated by the two layers of insulation 13 and 14. These insulating layers 13 and 14 can be either paper foil, or alternatively be films of various plastics like polyolefins or various composites known and similarly used in the art. An example of the latter and the type used in the present comparison test comprised two 12 μ thick layers of polypropylene and a layer of unmodified Kraft paper of a density of 1 and a thickness of 10 μ sandwiched in between. The elements 15 and 16 define strips for electrical connection.

FIG. 2 of the drawing, a vertical cross-section of capacitor 20, includes a metallic housing 21 with a cover 22 therefor insuring a tight fit, a capacitor component 23 of the type illustrated in the FIG. 1 and connectors 24 and 25 joining the bobbin plates to the outer bushings 26 and 27.

Thermal and chemical stability of the benzyl esters suitable for application according to this invention as compared with a conventional dielectric material were conducted in the following manner. In a series of capacitors, the capacitor casing such as that described above in FIGS. 1 and 2 is filled with the liquid dielectric composition of the Example such that the liquid fully impregnates all the dielectric material and concomitantly fills all the voids and interstices within the apparatus. Another series of capacitors of the same construction is impregnated in the same manner with dioctyl phthalate, a liquid dielectric conventionally used in capacitors. After aging under heat exposure (90° C) and electrical treatment (1,780 volts A.C.), each capacitor is periodically measured at 90° C and under 120 V and 1,500 V under 50 (c/s) Hertz for dielectric losses (tg δ).

The results obtained conducting the aforesaid tests are reported in the following Table. Each result is the arithmetic mean of a series of values.

TABLE

| Duration (hours) | | 0 | 120 | 241 | 493 | 556 | 949 | 998 | 1,573 | 1,817 | 2,402 | 3,519 | 4,348 | 4,832 | 5,664 |
|---|---|---|---|---|---|---|---|---|---|---|---|---|---|---|---|
| | DIELECTRIC LOSSES (tg δ × 10⁴) | | | | | | | | | | | | | | |
| 120 V | Product of Example | | | | | | 8.1 | | | 6.2 | 9.8 | | 11.3 | | 10.9 |
| | Dioctyl phthalate | 12.1 | 19.2 | | | 19.3 | | 25.1 | 17.1 | | | 26.3 | | 17.9 | |
| 1500 V | Product of Example | 4.1 | | 4.1 | 4.1 | | 3.8 | | | 3.5 | 3.6 | | 3.7 | | 3.5 |
| | Dioctyl phthalate | 5.4 | 10.5 | | | 13.9 | | | 20.3 | 14.7 | | 11.0 | | 9.9 | |

After 5,000 hours, no breakdown was observed with the capacitors impregnated with the product of the Example, whereas 70 percent of capacitors impregnated with dioctyl phthalate failed.

The above failure rate and the data from the table clearly demonstrate that the subject compositions are characterized by marked thermal and chemical stability over extended periods of operation as compared with conventional liquid dielectrics. Note, for example, that the dielectric losses for the compounds of this invention are minimal over a wide range of voltages and over an extended period of operation.

Figure 3:
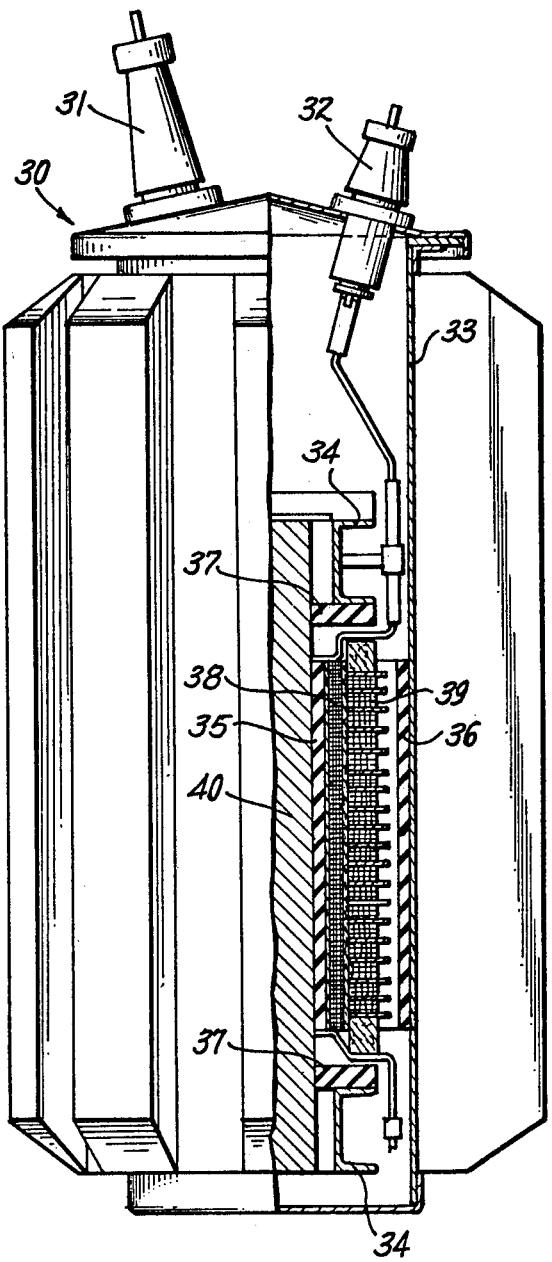
FIG. 3 is a vertical cross-section, partly in elevation, of a transformer which has been insulated according to the invention.

The marked improvements in thermal and chemical stability are shown with capacitors, however, it is within the scope of this invention that the dielectric compositions herein described are useful for insulating and dielectric uses for all types of electrical devices and components of electrical equipment. For example, in FIG. 3 there is illustrated a transformer 30 including a high voltage bushing 31, and low voltage bushing 32, a transformer casing 33, pressure flanges 34 and insulating barriers 35 and 36 which, on the one hand respectively separate the low voltage coil 38 from the iron core 40, and on the other separate, the high voltage coil 39 from the casing. The strips 37 are insulating spacers, and the conductors of the low voltage and high voltage coils are suitably insulated with any solid dielectric material such as paper. The transformer casing of FIG. 3 is filled with the composition of the Example. This dielectric liquid fills all of the interspaces in the transformer and also fully impregnates both the coils and the various other elements of the apparatus.

While the invention has now been described in terms of preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A dielectric composition comprising a liquid mixture of at least two dielectric compounds comprising at least one benzyl ester having the formula I:

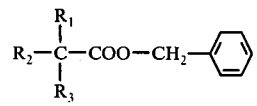

wherein:
$R_1$ is hydrogen or alkyl; and
$R_2$ and $R_3$ are alkyl, the total number of carbon atoms contained in $R_1$, $R_2$ and $R_3$ being between 3 and 20.

2. The composition according to claim 1 wherein the total number of carbon atoms contained in $R_1$, $R_2$ and $R_3$ is between 5 and 11.

3. The composition according to claim 1 wherein the total number of carbon atoms contained in $R_1$, $R_2$ and $R_3$ is between 7 and 9.

4. In an insulated electrical component, the improvement which comprises insulation material comprising the composition according to claim 3.

5. In an insulated electrical component, the improvement which comprises insulation material comprising the composition according to claim 1.

6. The insulated electrical component according to claim 5, said composition further comprising a stabilizer.

7. The insulated electrical component according to claim 6, wherein said stabilizer is an epoxide.

8. The dielectric composition as defined in claim 1, comprising a liquid mixture of benzyl esters, each of which has the formula (I):

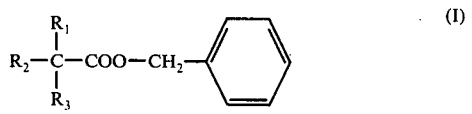

wherein:
$R_1$ is hydrogen or alkyl; and
$R_2$ and $R_3$ are alkyl, the total number of carbon atoms contained in $R_1$, $R_2$ and $R_3$ being between 3 and 20.

9. In an insulated electrical component, the improvement which comprises insulation material comprising the composition according to claim 8.

10. In an insulated electrical component, the improvement which comprises insulation material comprising a liquid benzyl ester of the formula (I) which is defined in claim 1.

11. A method of insulating an electrical component which comprises the step of applying the dielectric composition, as defined in claim 1, to a surface of the electrical component.

12. A method of insulating an electrical component which comprises the step of applying a liquid benzyl ester having the formula (I), which is defined in claim 1.

* * * * *